United States Patent [19]
Johnson

[11] Patent Number: 4,838,748
[45] Date of Patent: Jun. 13, 1989

[54] HOIST AND ACCUMULATOR ARM APPARATUS

[76] Inventor: Alan T. Johnson, 20434 S. Spring Water Rd., Estacada, Oreg. 97023

[21] Appl. No.: 172,291

[22] Filed: Mar. 23, 1988

[51] Int. Cl.[4] .................. B65G 59/02; B65G 59/08
[52] U.S. Cl. ......................... 414/796.7; 271/159; 414/796; 414/795.8
[58] Field of Search .............. 271/157, 158, 159; 414/114, 117, 118

[56] References Cited

U.S. PATENT DOCUMENTS

| | | | |
|---|---|---|---|
| 3,616,951 | 11/1971 | St. Clari et al. | 414/117 X |
| 4,640,655 | 2/1987 | Jacobson | 414/118 X |

FOREIGN PATENT DOCUMENTS 161631  12/1957  Sweden ........................ 414/118

*Primary Examiner*—Robert J. Spar
*Assistant Examiner*—Janice Kriek
*Attorney, Agent, or Firm*—Richard C. Litman

[57] ABSTRACT

An apparatus for continuously feeding the individual elements from tiered loads has a hoist including both vertical and horizontal support members which can both be pivoted back to come in contact with an accumulator arm assembly by the motion of a rotatable support base thereby allowing the load to be raised upwards along an angular load path. The accumulator arm assembly includes a carriage assembly which can slide part of the way down the load path and independently extendible accumulator arms for extending beneath the bottom of the tiered load once approximately one-half of the load has been unloaded down the load-discharging members to the fixed and predeterminable load discharging point where it can be processed on a conventional feed table. After the accumulator arms have been extended and have begun to raise the remainder of the load along the last portion of the load path, the hoise is free to return to its initial position and accept a second load of material. In an alternate embodiment, the hoist is omitted thereby providing an accumulator arm assembly which can be retro-fitted into, and used in conjunction with existing hoists.

10 Claims, 4 Drawing Sheets

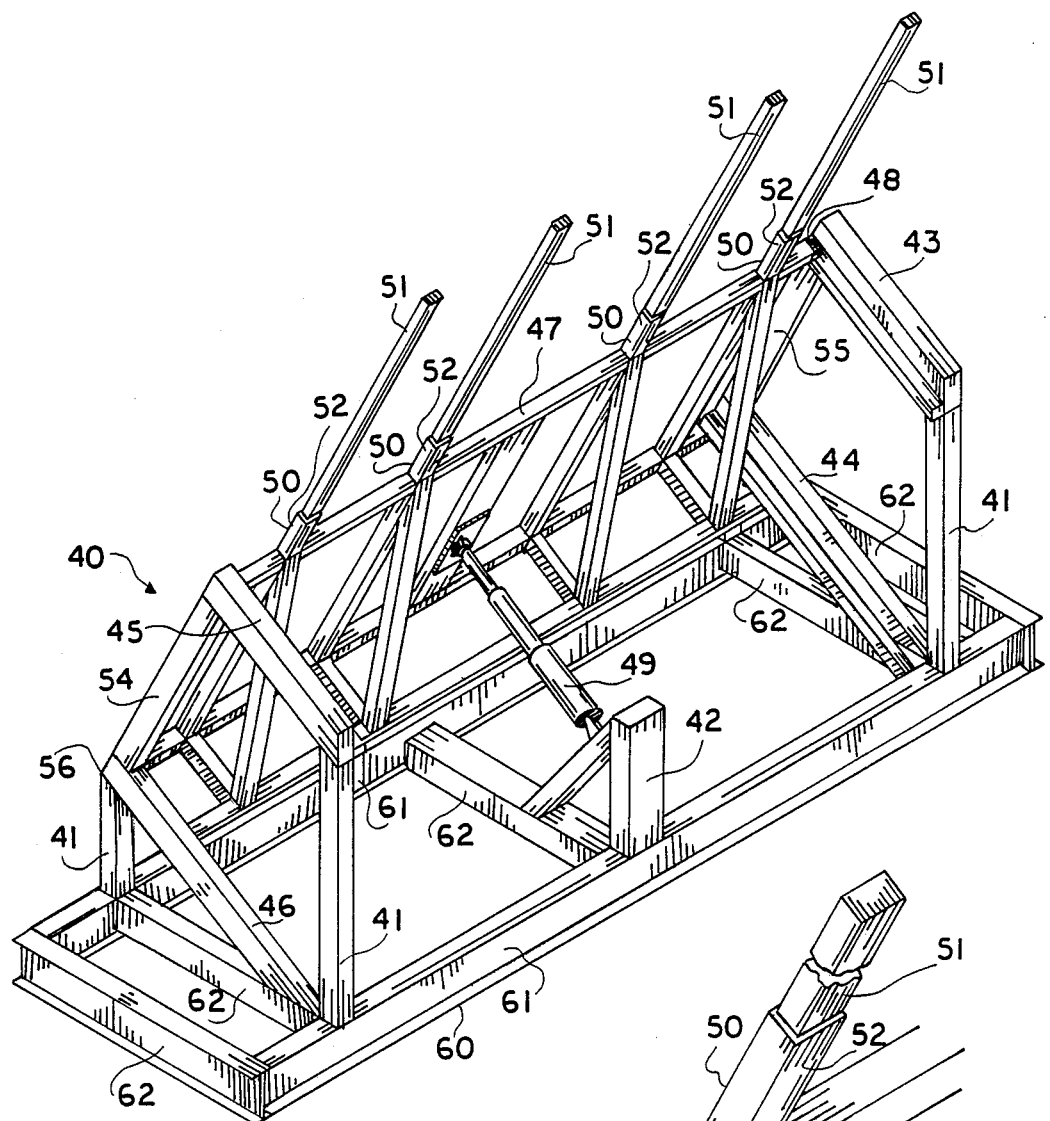
FIG_2
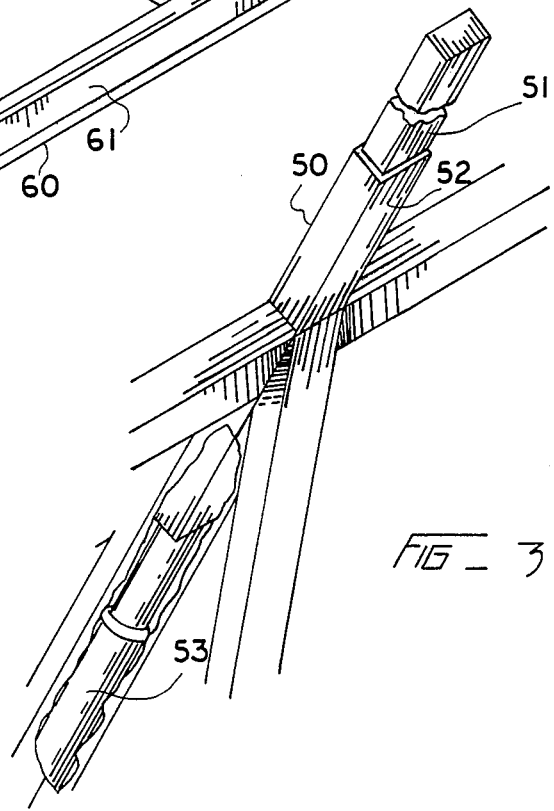
FIG_3

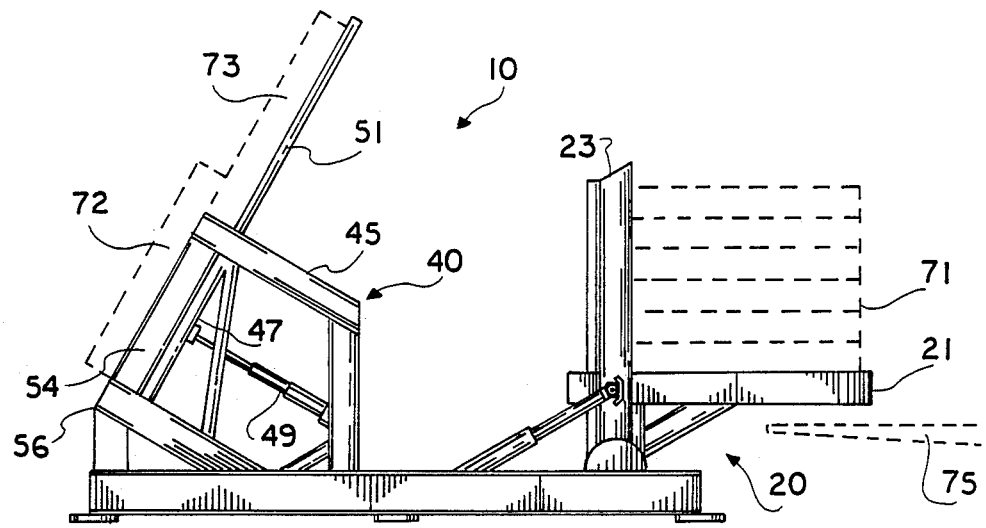
FIG_4
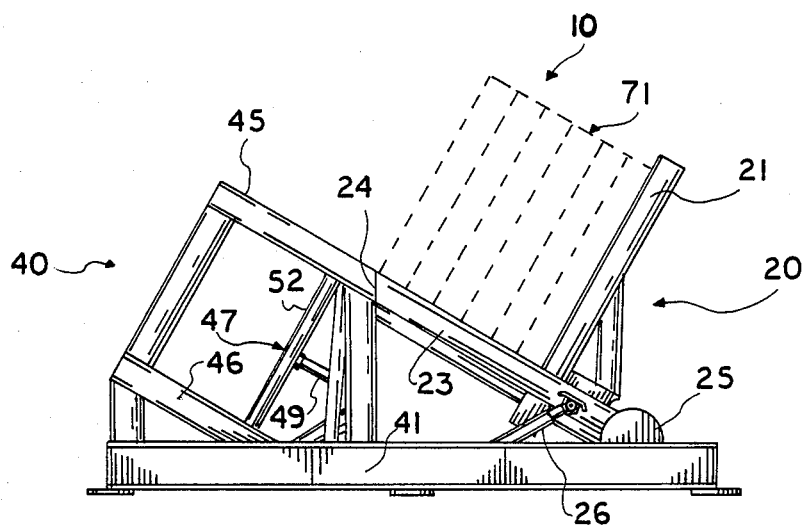
FIG_5
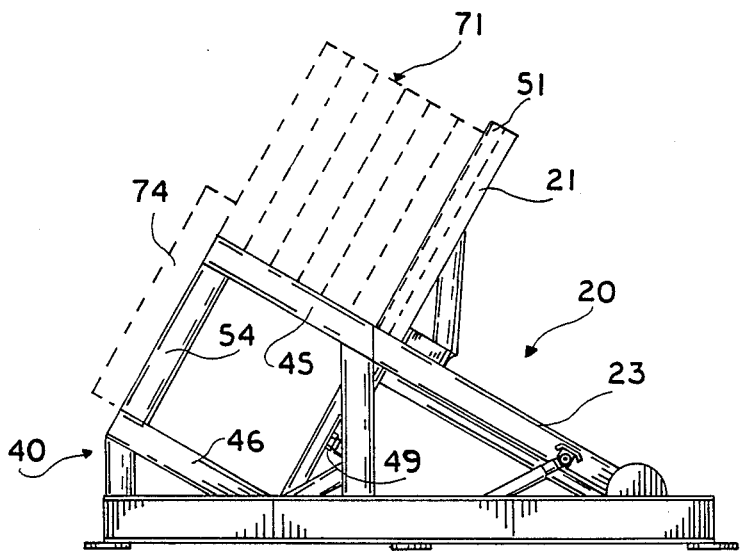
FIG_6

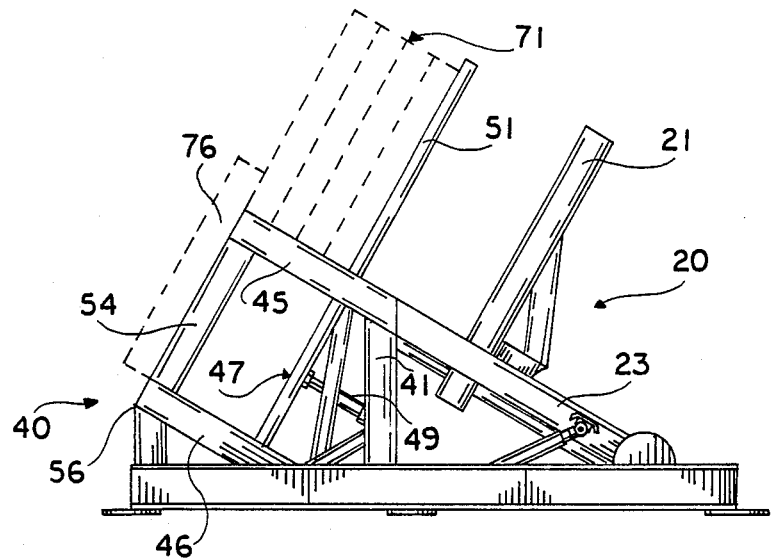
FIG_7
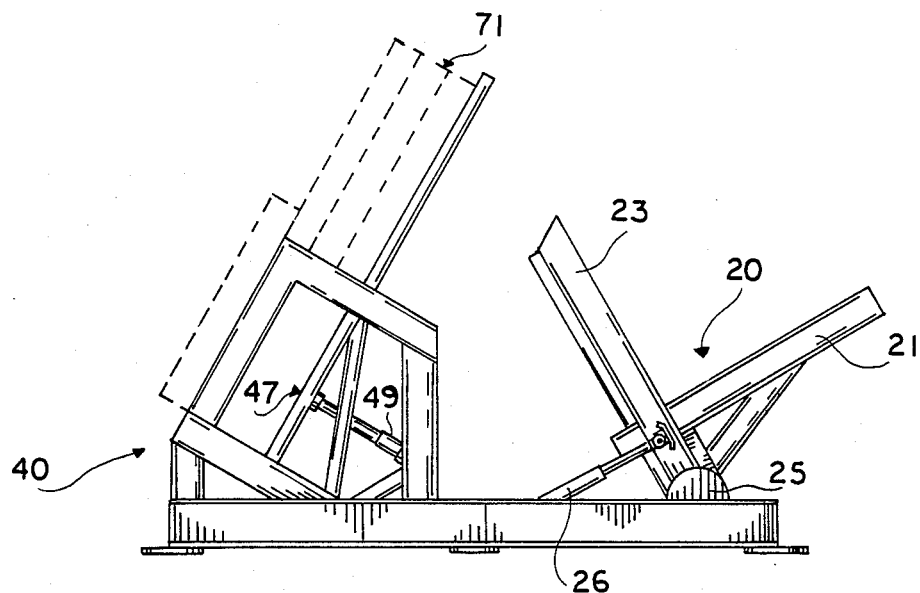
FIG_8

HOIST AND ACCUMULATOR ARM APPARATUS

BACKGROUND OF THE INVENTION

1. Field of the Invention

The present invention relates to machines which feed material onto, for example, a conveyor belt. More particularly, the present invention concerns a hydraulically-powered apparatus for lifting loads of tiered material and for continuously discharging material from these loads at a discharge point having a fixed and predeterminable location. The apparatus of the present invention is useful, for example, in discharging rough-cut lumber onto a conveyor belt or table where the lumber can be cut more precisely.

HISTORY OF THE PRIOR ART

The need for supplying a steady flow of individual workpieces to a predetermined location so that the workpieces can be processed into finished goods occurs in many industrial settings. For example, in the lumber industry, rough cut lumber must be cut, planned and sanded to the point where the lumber can be sold, for example, as studs. Over the years, a wide variety of hoists have been developed which can elevate a tiered load of lumber and then pivot back in such a way that the top tiers of wood slide onto a finishing table or conveyor belt. While lumber processing machinery was in its rudimentary stages of development, these types of hoists were still capable of delivering sufficient lumber to keep the processing machinery running at peak efficiency. Now that lumber processing machinery has become more efficient, however, the time required by conventional pivoting hoists to return to their initial positions and receive and elevate a second load has come to mean that the lumber processing machinery must sit idle for up to thirty seconds. This "down time" causes serious inefficiencies and losses of revenue over the course of a year.

The most relevant reference kown by the applicant is U.S. Pat. No. 4,640,655 issued to Jacobsen. The device disclosed in this patent sets out to achieve the same result as the present invention and utilizes a similar overall concept, but the structure of this device differs from the structure utilized by the present invention to the extent that U.S. Pat. No. 4,640,655 in no way eviscerates the patentability of the present invention. Inherent in U.S. Pat. No. 4,640,655 are several mechanical suboptimizations which limit both the efficiency and reliability of the device. The present invention does not fall prey to these problems.

Most fundamentally, the arrangement of the accumulator arm assembly and load-discharging surfaces utilized in U.S. Pat. No. 4,640,655 differs from that of the present invention. The accumulator arms of Jacobsen's device can only move linearly, i.e., they can be inserted into, or withdrawn from, the load path. The present invention, on the other hand, allows for these types of movement, and also provides for an accumulator arm carriage which can move angularly up the load path, thereby allowing the device's stationary load-discharging members to discharge successive tiers from the load at a fixed discharge point.

The structural arrangement utilized by the device disclosed in U.S. Pat. No. 4,640,655 also calls for both the hoist and accumulator arm assemblies to move vertically along the load path, the accumulator arms moving at half the speed of the hoist, thereby allowing the topmost tiers of the load to slide down the load-discharging arms. These movements must be carefully coordinated, if, for example, the accumulator arms rise too slowly, too many tiers of lumber will be discharged, perhaps causing the down-line wood processing machinery to malfunction. In the device of the present invention, however, only one set of components, either the horizontal supports of the hoist or the accumulator arm carriage, will be moving along the load path relative to the tiered load at any one time. This insures that only a single tier of lumber will be allowed to slide down the load-discharging members at any one time.

The structural arrangement of the device disclosed by U.S. Pat. No. 4,640,655, namely a rack and pinion arrangement, also requires that all of the accumulator arms be moved in unison. This means that even if a particular accumulator arm is not supporting lumber it will still extend and retract, thereby wasting energy. Furthermore, because of this arrangement, any damage to the screw used to drive the racks of the accumulator arms, will likely immobilize the entire mechanism. The device of the present invention, however, calls for independently movable accumulator arms. If one arm becomes damaged, it can be retracted and the device will likely still be capable of functioning. Also, the individual hydraulic cylinders used in conjunction with the accumulator arms of the present invention allow the operator to deactivate predetermined accumulator arms, thereby conserving energy. This property allows the device to function efficiently when used with lumber of widely varying lengths.

The structural arrangement utilized by the device of U.S. Pat. No. 4,640,655 also dictates that the discharge point where the lumber slides off of the device is not constant. As the hoist is moving up, the load-discharging arms of this device will move up as well, albeit at about one-half of the speed of the hoist, and hence the tiers of lumber will be discharged at progressively higher points relative to the device. Once the hoist has reached its maximum height along the load path and the accumulator arms have extended to accept the remainder of the load, the load-discharging arms disclosed by U.S. Pat. No. 4,640,655 begin to retract, allowing the remaining lumber to slide onto the processing table. Again, however, this structural arrangement results in the lumber being discharged at varying locations, in this case progressively lower relative to the device. It can be very difficult and expensive to adapt existing lumber processing tables or conveyor belts to accept lumber at varying heights. All of these problems are avoided by the present invention because of the fixed load-discharging members utilized by this device. This property allows the device to deliver lumber to a fixed and easily predeterminable location, thereby making it easy to utilize the device of the present invention with a wide variety of lumber processing machinery.

While it is true that the primary disadvantages and suboptimizations of the device disclosed by U.S. Pat. No. 4,640,655 concern the structural relationships between the various component parts, especially the accumulator arms and load-discharging members of the device, this device also suffers inherent suboptimizations in the hydraulic system used to power the movement of the device's parts. Jacobsen's device, as described in U.S. Pat. No. 4,640,655, calls for a unitary hydraulic system to control the movement of both the hoist and accumulator arms. This limitation means, for example, that Jacobsen's accumulator arm assembly can only be used with Jacobsen's hoist, and no other. The device of the present invention, on the other hand, calls for segregated hydraulic cylinders for controlling each of the accumulator arms, the accumulator arm carriage, and the hoist pivoting system. This segregation of hydraulic systems allows the accumulator arm assembly of the present invention to be utilized with, or retrofitted into, a wide variety of pre-existing hoists, both hydraulic and electric.

SUMMARY OF THE INVENTION

Therefore, it is a primary objective, advantage and goal of the present invention to correct the above mentioned problems and eliminate the previously-discussed suboptimizations by providing an apparatus capable of lifting multiple loads of tiered material and also capable of discharging successive tiers of material to a discharge point having a fixed and pre-determinable location.

It is a further object of the present invention to provide an apparatus which can tilt and elevate a tiered load of material in such a way that once the top-most tier of the load is elevated beyond the top of the accumulator arm apparatus, it will slide down the load-discharging members to a discharge point having a fixed and pre-determinable location.

It is a further object of the present invention to provide an apparatus which utilizes separable hydraulic systems to control the accumulator arms, accumulator arm carriage and hoist mechanism, and thereby is easily separable into its constituent hoist and accumulator arm assemblies. Fulfillment of this object also allows the accumulator arm assembly of the present invention to be easily retro-fitted into use with pre-existing hoists, either hydraulic or electric.

The foregoing, and other objectives, features, and advantages of the present invention will become more apparent from the following detailed description, drawings and appended claims.

BRIEF DESCRIPTION OF THE DRAWINGS

FIG. 2 is a perspective view of an alternate embodiment of the present invention wherein the hoist has been omitted.

FIG. 3 is a perspective view, partially in section, of one of the accumulator arm assemblies of the present invention.

FIG. 4 is a side view of the apparatus of the present invention in use showing the accumulator arm assembly discharging the last elements of an earlier tiered load and a first tiered load being loaded onto the hoist.

FIG. 5 is a side view of the apparatus of the present invention in use showing the accumulator arms retracted within their sleeves and the accumulator arm carriage partially lowered. The hoist is shown pivoted back against the accumulator assembly; the hoist has also started to raise the second load of tiered material.

FIG. 6 is a side view of the apparatus of the present invention in use showing the hoist elevating the load to the point where the top tiers have risen above the top of the accumulator arm apparatus and begun to slide down to a discharge point having a fixed and predeterminable location. This view, in phantom lines, also shows the accumulator arms extended beneath the remainder of the first load.

FIG. 7 is a side view of the apparatus of the present invention in use showing the accumulator arm carriage continuing to elevate and discharge the remainder of the first tiered load. This view also shows the horizontal support members of the hoist in the process of retracting.

FIG. 8 is a side view of the apparatus of the present invention in use showing the accumulator arm apparatus continuing to elevate and discharge the remainder of the first tiered load. This view also shows the hoist pivoting forward in preparation for receiving a second load of tiered material.

DETAILED DESCRIPTION OF THE PREFERRED EMBODIMENT

Figure 1:
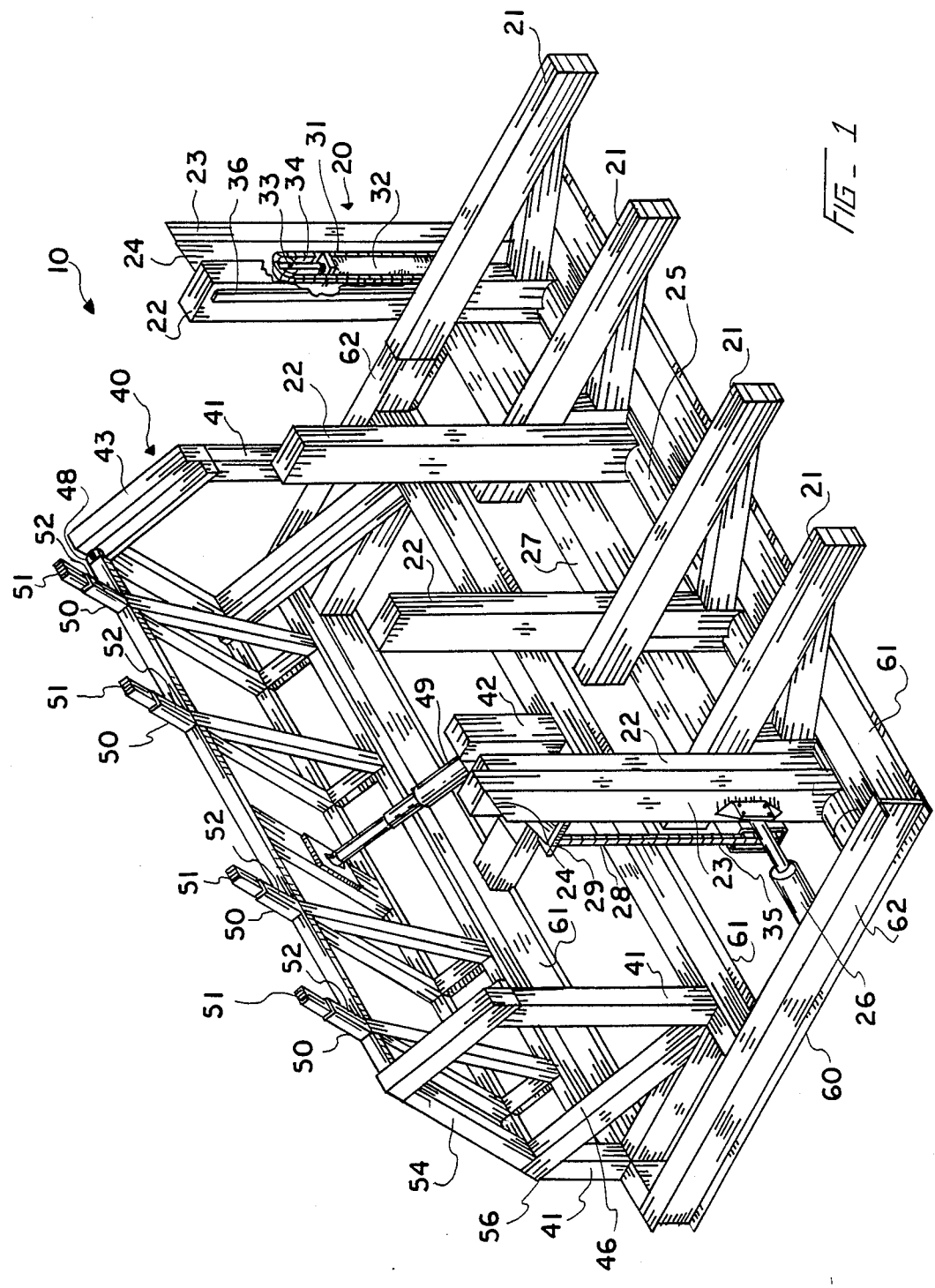
FIG. 1 is a perspective view of the preferred embodiment of the present invention showing both the hoist and accumulator arm elements of the present invention. In this view, a portion of the vertical support member on the right end of the hoist has been cut away to allow for better description of the hoist mechanism.

Referring now to the drawing figures wherein like numbers refer to like elements throughout, the apparatus 10 is shown. As is best seen in FIG. 1, the apparatus 10 includes generally a hoisting apparatus 20 and an accumulator arm apparatus 40. In a first embodiment, as is best seen in FIG. 1, the hoist 20 and accumulator arm apparatus 40 are both supported by a common frame or base 60 having both lateral 61 and longitudinal 62 supports.

The hoist 20 includes both horizontal 21 and vertical 22 support members. The vertical support members 23 at each end of the hoist 20 are positioned in close proximity to the next vertical support members 22 moving inward and have angled top faces 24 for positioning against, the aligning with, the vertical supports 41 of the accumulator arm apparatus 40.

The vertical 22 and horizontal 21 support members are mounted on a rotatable support base cylinder 25 which is pivotably mounted parallel to, and in close proximity with the front lateral support 61 of the support frame 60.

The hoist 20 also includes hydraulic cylinders 26 mounted at each end of the hoist 20 for rotating the support base cylinder 25 and thereby pivoting the hoist 20 forwardly to the point where it comes in contact with the accumulator arm apparatus 40.

The horizontal support members 21 of the hoist 20 are mounted on a horizontal beam 27 which is elevated by means of a cylinder assembly 31. The cylinder assembly 31 includes a hydraulic cylinder 32 with a pulley 33 mounted on top of the hydraulic cylinder 32 and a chain 34 looped over the pulley 33 and fastened at one end to the horizontal beam 27 and fastened at the other end to the support base cylinder 25. This arrangement produces a 2:1 displacement configuration and allows for the efficient elevation of the horizontal supports 21 of the hoist 20; as the hydraulic cylinder 32 expands one unit of length, the chain 34 raises the horizontal beam and its attached horizontal support members 27 two units of length.

The hoist 20 also includes a leveling assembly 35 to insure that the cylinder assembly 31 raises the horizontal beam 27 and hence the horizontal supports 21 of the hoist 20 in a level manner. The leveling assembly 35 includes a pair of pulleys 30, one mounted at each end of the horizontal beam 27, and a chain 28 tethered between the two pulleys 30 and fastened at one end to a bracket 29 mounted on the top of the outermost vertical support member 23 and fastened at the other end to the support base cylinder 25. On the side of the hoist 20 adjacent to the cylinder assembly 31, the chain 28 is threaded over one of the pulleys 30 and on the side of the hoist 20 opposite the cylinder assembly 31 the chain 28 is threaded under the other pulley 30. This arrangement effectively counteracts the binding torque which would otherwise result from the fact that the cylinder assembly 31 elevates the horizontal beam 27 of the hoist 20 from one side rather than through its center of gravity. For purposes of clarity, these details are omitted from FIG. 1. The level elevation of the horizontal supports 21 of the hoist 20 is also aided by the fact that the vertical support members 22 of the hoist 20 include vertical runners 36 for guiding the movement of the horizontal supports 21 up and down along the vertical supports 22.

Like the hoist 20, the accumulator arm apparatus 40 is mounted on a frame 60 having both lateral 61 and longitudinal 62 supports. The accumulator arm apparatus 40 includes vertical supports 41, a central vertical anchoring post 42 and four angularly disposed accumulator arm carriage guides 43, 44, 45 and 46. Each side of the accumulator arm apparatus 40 has two angularly-disposed accumulator arm carriage guides, 43 and 44 on the right and 45 and 46 on the left side of the accumulator arm apparatus 40. The accumulator arm apparatus 40 also includes an accumulator arm carriage 47 which is slidably engaged with the accumulator arm carriage guides 43, 44, 45 and 46 by means of wheels 48 mounted on the accumulator arm carriage 47 at those points which come in contact with the accumulator arm carriage guides 43, 44, 45 and 46. The movement of the accumulator arm carriage 47 is governed by a hydraulic cylinder 49 fastened at one end to the center of the accumulator arm carriage 47 and fastened at the other end to the vertical anchoring post 42. The accumulator arm carriage 47 also includes a plurality of accumulator arm assemblies 50. In the preferred embodiment of the present invention, as is best seen in FIG. 1, the accumulator arm carriage 47 includes four accumulator arm assemblies 50, but clearly different numbers of accumulator arm assemblies 50 can be utilized in different applications of the present invention.

As is best seen in FIG. 3, each accumulator arm assembly 50 includes an accumulator arm 51, a sleeve 52 and a hydraulic cylinder 53 mounted within the sleeve 52 for extending and retracting the accumulator arm 51.

Finally, the accumulator arm apparatus 40 also includes two load-discharging members 54 and 55 which are disposed at approximately right angles to the accumulator arm carriage guides 43, 44, 45 and 46 for slidably guiding the tiered lumber as it is unloaded. The tiered material sliding down the load-discharging members 54 and 55 leaves the apparatus 10 at a discharge point 56 which has a fixed and predeterminable location.

The primary advantage and innovation presented by the present invention is its structural framework which, as will be fully explained in the next section, allows the device to feed a continuous flow of tiered material, for example, to lumber processing machines. Hence, it is to be understood that a variety of electronic and hydraulic systems could be employed in producing the device of the present invention. Nevertheless, in the preferred embodiment, the device of the present invention will utilize a fixed volume, non-compensated hydraulic system. That is, it will be the case for all of the device's hydraulic valves that when in neutral they will have the pressure port open and will deliver full fluid flow at minimum pressure.

The present invention, as is best seen in FIG. 2, can also be utilized in an alternate embodiment which omits the hoist 20 components of the present invention and instead focuses on the accumulator arm apparatus 40. In this alternate embodiment, the device of the present invention could easily be utilized in conjunction with a pre-existing hoist, either hydraulic or electric, and thereby retro-fitted into a lumber processing operation with only small expense and "down time" of the operation.

Operation

As is best seen in FIGS. 4, 5, 6, 7 and 8, because of the structural arrangement of its component parts, the apparatus of the present invention is capable of providing an almost continuous supply of tiered material to, for example, a processing table or conveyor belt.

As is best seen in FIG. 4, the process starts when a first load of tiered material 71 is loaded onto the horizontal supports 21 of the hoist 20 against the vertical supports 22 of the hoist 20 by, for exmaple, a forklift 75. FIG. 4 also shows the accumulator arm apparatus 40 in the process of completing the unloading of an earlier load of tiered material. The second from the last tier of this material 72 is shown sliding down the load discharging members 54 and 55 towards the discharge point 56 where the material can be discharged onto a conveyor belt or table for processing (not shown). The last tier of this earlier load 73 is shown in FIG. 4 being supported by both the accumulator arms 51, which are shown in their extended position, and the top two accumulator arm carriage guides 43 and 45. The accumulator arms 51 are shown being supported by the accumulator arm carriage 47 which is elevated or upwardly displaced by a central hydraulic cylinder 49 which is shown in FIG. 4 almost fully extended.

In the next step of the process, as is best shown by FIG. 5, the tiered material from the earlier load (i.e., 72 and 73) has been completely discharged, the accumulator arms 51 have been retracted within the sleeves 52, and the central hydraulic cylinder 49 has retracted thereby causing the accumulator arm carriage 47 to partially roll down the accumulator arm carriage guides 43, 44, 45 and 46.

During this second step of the process, as is again best shown in FIG. 5, the hoist 20 is tilted forward toward the accumulator apparatus so that the vertical supports of the hoist 22 are inclined at a predetermined angle relative to vertical. The vertical supports positioned closest to the outside of the hoist 23 are provided with top faces 24 which are angled in such a way that when tilted forward, the vertical supports 23 come flushly in contact with the vertical supports 41 of the accumulator arm apparatus 40. In this way, the vertical supports 22 and 23 of the hoist 20 and the top two accumulator arm carriage guides 43 and 45 form a continuous, angled surface against which the first load of tiered material 71 can be induced to smoothly slide upwards by the movement of the horizontal supports 21 of the hoist 20. The pivoting movement of the hoist 20 toward the accumulator arm apparatus 40 is governed by a pair of hydraulic cylinders 26, one on each side of the hoist 20, which are shown in FIG. 5 fully retracted. This pivoting motion of the hoist 20 is permitted by the fact that the hoist 20 is mounted on a rotatable support base cylinder 25.

In the third stage of the process, which is best shown in FIG. 6, the horizontal supports 21 of the hoist 20 are shown at their maximum elevation, at the top of the vertical support members 22 and 23. This movement of the horizontal supports 21 of the hoist 20 in turn causes the first tiered load 71 to be supported by the top two accumulator arm carriage guides 43 and 45. Those tiers of material (e.g., 74) which have been raised above the top of the accumulator arm carriage guides 43 and 45 by the horizontal support members 21 of the hoist 20 slide down the load-discharging members 54 and 55 onto, for example, a conveyor belt or processing table (not shown).

During this stage of the process, the hydraulic cylinder 49 mounted at the center of the accumulator arm apparatus 40 has become fully compressed and the accumulator arm carriage 47 is positioned at its lowest elevation, at the bottom of the accumulator arm carriage guides 43, 44, 45 and 46. As is also visible in FIG. 6, once the horizontal supports 21 of the hoist 20 have raised the bottom of the first load of tiered material 71 above the accumulator arm carriage 47, the appropriate hydraulic cylinders 53 within the accumulator arm carriage 47 are activated, thereby extending the necessary accumulator arms 51 (shown in dashed lines) beneath the remainder of the first tiered load 71.

During the fourth stage of the process, as is best shown in FIG. 7, the accumulator arm apparatus 40 has taken over the functions of supporting and elevating the remainder of the first tiered load 71. The accumulator arms 51 remain fully extended. The accumulator arm carriage 47 is rolled upwards along the accumulator arm guides 43, 44, 45 and 46 by the hydraulic cylinder 49 mounted at the center of the accumulator arm apparatus 40, which is shown in FIG. 7, partially extended. As each successive tier of material (e.g., 76) is elevated beyond the top of the accumulator arm carriage guides 43, 44, 45 and 46, the tiered material 76 slides down the pair of load-discharging members 54 and 55 to the discharge point 56 where the tiered material 76 can be processed on, for example, a conveyor belt or processing table (not shown).

During this stage of the process, the horizontal supports 21 of the hoist 20 have begun to return to the bottom of the vertical supports 22 and 23 of the hoist 20. The vertical supports 22 and 23 of the hoist 20 remain in contact with the vertical supports 41 of the accumulator arm apparatus 40.

In the final stage of the process, as is best seen in FIG. 8, the accumulator arm carriage 47 continues to be elevated by the hydraulic cylinder 49 mounted in the center of the accumulator arm apparatus 40, thereby discharging successive tiers from the first load of tiered material 71. During this stage of the process, once the horizontal supports 21 of the hoist 20 have returned to the bottom of the vertical supports 22 and 23 of the hoist 20, the hoist 20 begins to pivot away from the accumulator. This movement of the hoist 20 is governed by the hydraulic cylinders 26 mounted on each side of the hoist 20 and permitted by the rotation of the support base cylinder 25. The hydraulic cylinders 26 mounted on each side of the hoist 20 will continue to extend, and the support base cuylinder 25 will continue to rotate until the vertical supports 22 and 23 are again vertical and the horizontal supports 21 are again horizontal, at which point a new load of tiered material can be loaded onto the horizontal supports 21 (as shown in FIG. 4).

In this way the apparatus of the present invention is able to deliver an even and nearly continuous supply of tiered material, for example lumber, to a discharge point having a fixed and predeterminable location, whereupon the material can be processed on either a conveyor belt or table.

The above description of the preferred embodiment of both the structure and operation of the present invention is merely intended as descriptive, and should not be construed to limit the scope of the present invention and hence any modifications or future substitutions which fall within the scope of the claims of the present invention can be resorted to.

I claim:

1. An apparatus for lifting loads of tiered material and for continuously feeding tiers of material from said tiered loads, comprising:

(a) hoist means for receiving and then hoisting a tiered first load from a load base along a load path; said hoist means including:
 a base;
 a plurality of pivoting vertical support members for guiding the elevation of said load of tiered material and for restraining the horizontal movement of said load of tiered material;
 a plurality of horizontal support members for supporting said load while it is being elevated, slidably joined to said vertical support members, the movement of which defines a load path from a load base to the top ends of said vertical support members, along which said tiered load is elevated;
 a rotatable support base upon which said vertical support members are mounted, the rotation of said support base defining the extent to which said vertical support members pivot, which pivoting action in a forward direction causes the tiered load to exert pressure against said vertical support members;
 (b) load receiving and discharging means for receiving said load of tiered material and continuously discharging successive tiers of said load, said load receiving and discharging means including:
 a base;
 a pair of angularly disposed load-receiving members for guiding the elevation of said load of tiered material after said hoist means has been rotated in a forward direction whereupon the tops of said vertical support members come in contact with, and align themselves with, said load-receiving members, and after said horizontal support members have been elevated to the point where the top tier of said tiered load is elevated beyond the tops of said vertical support members;
 load discharging members angularly connected to said load-receiving members for continuously and slidably discharging successive tiers of material from the top of said load of material aligned so that when a tier of material is elevated beyond the top edges of said load-receiving members, said tier will slide down said load-discharging members to a discharge point;
 said discharge point having a fixed and predeterminable location;
 a load-accepting carriage slidably mounted to move from the bottom to the top of said load-receiving members; and
 said load-accepting carriage further including a plurality of independently-extendible accumulator arms for extending into an extension of said load path, beneath said first load of tiered material after the bottom of said load has been elevated to at least the bottom of said load-receiving members, thereby allowing the horizontal support members of said hoist means to retract along the load path, pivot downwardly, and accept a second load of tiered material while said accumulator arms continue to elevate and discharge the remainder of said first load of tiered material.

2. The apparatus of claim 1 wherein said hoist means includes a horizontal beam upon which said horizontal support members are mounted, such that elevating said horizontal beam levelly elevates said horizontal support members along said load path.

3. The apparatus of claim 2 wherein said hoist means includes appropriate lifting and leveling means for levelly urging said horizontal beam up and down along said load path.

4. The apparatus of claim 3 wherein said lifting means is a hydraulic cylinder.

5. The apparatus of claim 4 wherein the outermost of said vertical support members disposed at each end of said hoist means includes a top face, the angle formed by said top faces and the horizontal being the complement of the angle of pivot assumed by each of said vertical support members after said support base has rotated forwardly against said load-receiving and discharging means prior to elevation of said load of tiered material.

6. The apparatus of claim 5 wherein said hoist means includes an appropriate source of power for rotating said support base and thereby pivoting said vertical support members to the point where said vertical support members come in contact and become aligned with the load-receiving members of said load-receiving and discharging means.

7. The apparatus of claim 6 wherein said source of power is a pair of hydraulic cylinders, one of said pair of cylinders mounted at each end of said hoist means, one end of said cylinder fastened to a vertical support member and the other end of said cylinder fastened to the base of said hoist means.

8. The apparatus of claim 7 wherein said load-accepting carriage of the load-receiving and discharging means is slidably movable, said movement ranging from the bottom to the top of said load-receiving members, and power means producing and controlling the movement of said load-accepting carriage.

9. The apparatus of claim 8 wherein said power means comprises a hydraulic cylinder, said cylinder mounted in approximately the middle of said load-accepting carriage, one end of said cylinder fastened to said load-accepting carriage and the other end of said cylinder fastened to the base of said load-receiving and discharging means.

10. The apparatus of claim 9 wherein each of said plurality of accumulator arms includes:
an arm member;
a sleeve member; and,
a hydraulic cylinder mounted within said sleeve member, one end of said hydraulic cylinder fastened to the base of said sleeve member and the other end of said hydraulic cylinder fastened to the base of said arm member, thereby allowing each of said accumulator arms to be extended or retracted independently of the others.

* * * * *